United States Patent [19]
Song

[11] Patent Number: 5,992,485
[45] Date of Patent: Nov. 30, 1999

[54] SAWING MACHINE AND SAWING PROCESSING METHOD FOR A PLATE MEMBER

[75] Inventor: Byung-Jun Song, Kwangmyung, Rep. of Korea

[73] Assignee: SDS USA, Inc., Palisades Park, N.J.

[21] Appl. No.: 09/100,566

[22] Filed: Jun. 19, 1998

[51] Int. Cl.$^6$ .............. B27B 1/00; B27B 19/00; B27M 1/08
[52] U.S. Cl. .............. 144/356; 7/158; 74/22 R; 74/325; 83/837; 144/1.1; 144/3.1; 144/35.1; 144/365; 144/367; 364/474.02; 364/474.21; 408/22; 408/24
[58] Field of Search .................. 29/26 R, 26 A; 30/525; 364/474.21, 474.09, 474.28, 474.34, 474.2; 7/158, 165; 144/1.1, 3.1, 39.1, 39.2, 72–78, 356, 357, 363–367, 92; 408/21, 22, 24; 83/835, 837, 697; 74/22 R, 44, 325

[56] References Cited

U.S. PATENT DOCUMENTS

| | | | |
|---|---|---|---|
| 1,240,173 | 9/1917 | Brewer | 408/22 |
| 1,660,887 | 2/1928 | Romanoff | 144/35.1 |
| 2,101,583 | 12/1937 | Honneknovel | 408/22 |
| 2,417,170 | 3/1947 | Langfelder | 408/21 |
| 4,288,851 | 9/1981 | Manabe et al. | 144/35.1 |
| 5,119,708 | 6/1992 | Musgrove | 83/835 |

FOREIGN PATENT DOCUMENTS 3022493  1/1981  Germany .

*Primary Examiner*—W. Donald Bray
*Attorney, Agent, or Firm*—F. Chau & Associates, LLP

[57] ABSTRACT

A workpiece processing apparatus for processing a predetermined plate member and a sawing process method therefor. A workpiece processing apparatus which includes a workpiece mounting assembly for receiving a workpiece; a tool assembly having a tool mounting element configured for rotational and reciprocal motion, the tool assembly positioned adjacent to the workpiece mounting assembly; the workpiece mounting assembly being movable relative to said tool assembly to position the tool mounting element adjacent the workpiece; and a tool positioned in said tool mounting element and defining a longitudinal axis, said tool having a drilling portion and a cutting portion. A method for processing a workpiece which includes the steps of providing a workpiece processing apparatus capable of performing a drilling function and a sawing function; placing the workpiece on a workpiece mounting assembly of the workpiece processing apparatus; positioning a drilling assembly of the workpiece processing apparatus above a predetermined location on the object; rotating the drilling assembly to drill a hole through the workpiece; chucking the tool after it passes through the hole drilled in the workpiece; reciprocating the tool to cut a portion of the workpiece; and moving the workpiece mounting assembly to thereby move and cut the workpiece based on a predetermined set of data.

17 Claims, 9 Drawing Sheets

SAWING MACHINE AND SAWING PROCESSING METHOD FOR A PLATE MEMBER

BACKGROUND OF THE INVENTION

1. Field of the Invention

The present invention relates to a sawing machine and a processor controlled sawing method for a workpiece, such as a plate member, and more particularly, to a sawing machine and a processor controlled method in which drilling and sawing functions for a predetermined plate member can be performed integrally or in a single operation.

2. Description of the Related Art

To shape a workpiece, such as a panel, plywood, or plate made of materials such as wood, paper, metal, etc., into products of a desired shape, it is generally necessary to perform a plastic deformation such as, for example, cutting, folding and bending a plate member. For example, in order to fabricate new products of various designs, a sawing and cutting process which cuts a predetermined pattern 103 from the central portion of a plate surface, as shown in FIG. 8, may be required.

However, it is often difficult to perform a sawing function in the central portion of the plate surface of a plate member 101 since two discrete functions are required. That is, a hole must first be formed at a predetermined position of the plate member 101 with a drilling machine or a punching machine to permit insertion of a saw blade therethrough, and then the sawing function may be performed with a sawing machine to make a desired shape. Therefore, use of prior art machines has proven to be inconvenient since two discrete operations (i.e., drilling and sawing) are required, and also a separate device must be provided to execute each function. Recently, such a dual function has been performed using a laser, but the laser has drawbacks in that a cutting edge of the plate member is uneven due to high temperatures associated therewith, and the manufacturing cost increases.

Therefore, there is a need in the art for an apparatus capable of performing the two functions of drilling and sawing in a single operation.

SUMMARY OF THE INVENTION

In order to solve these and other problems, it is an object of the present invention to provide a sawing machine and a sawing processing method in which drilling and sawing functions for a predetermined plate member can be performed integrally, thereby easily and efficiently providing a plate shape of a desired pattern.

To accomplish the objects of the present invention, there is provided a workpiece processing apparatus which includes a workpiece mounting assembly for receiving a workpiece; a tool assembly having a tool mounting element configured for rotational and reciprocal motion, the tool assembly positioned adjacent to the workpiece mounting assembly; the workpiece mounting assembly being movable relative to said tool assembly to position the tool mounting element adjacent the workpiece; a tool positioned in said tool mounting element and defining a longitudinal axis, said tool having a drilling portion and a cutting portion; and a controller for controlling the movement of the workpiece mounting assembly and the tool assembly according to data which corresponds to a predetermined cut configuration.

The tool assembly may include a drilling assembly and a sawing assembly. The sawing assembly further includes a chucking member shaped in the form of a round bar, the chucking member having a hook assembly on an upper end thereof, the hook assembly configured to move between an engagement position with an end of the tool after the end is passed through a hole formed in the workpiece, and a release position therefrom. The sawing assembly further includes a bushing configured to at least partly house the chucking member, the bushing further configured to guide the chucking member during longitudinal motion; a motor mounted adjacent to the chucking member; a driving pulley mounted on a driving shaft connected to the motor; a driven pulley mounted on a circumferential surface of the bushing; and a belt mounted around the driving pulley and the driven pulley to transfer a driving force of the motor from the driving pulley to the driven pulley to rotate the bushing. The sawing assembly further includes an elevation motor assembly mounted adjacent to the chucking member for moving the chucking member in a longitudinal reciprocating motion and a release mechanism for releasing the engagement between the hook and the tool.

The drilling assembly includes a cylindrical tube for housing the tool; a cylinder actuator for moving the tool in a longitudinal direction; and a rotary driving assembly for rotating the tool, wherein the rotary driving assembly further includes a motor mounted adjacent to the cylindrical tube; a driving pulley mounted on a driving shaft connected to the motor; a driven pulley mounted on a circumferential surface of the cylindrical tube; and a belt mounted around the driving pulley and the driven pulley to transfer a driving force of the motor from the driving pulley to the driven pulley.

A method for processing a workpiece is also provided which includes the steps of providing a workpiece processing apparatus capable of performing a drilling function and a sawing function; placing the workpiece on a workpiece mounting assembly of the workpiece processing apparatus; positioning a drilling assembly of the workpiece processing apparatus above a predetermined location on the object; rotating the drilling assembly to drill a hole through the workpiece; chucking the tool after it passes through the hole drilled in the workpiece; reciprocating the tool to cut a portion of the workpiece; and moving the workpiece mounting assembly to thereby move and cut the workpiece based on a predetermined set of data.

A cutting and drilling tool is also provided which includes an elongate shaft wherein a first portion of the elongate shaft is formed in a shape of a drill bit for drilling a hole in a workpiece and a second portion of the elongate shaft has at least one cutting edge formed thereon for cutting the workpiece. The cutting and drilling tool may be formed of a hardened steel and may have a plurality of saw teeth formed on the second portion of the elongate shaft for cutting the workpiece.

BRIEF DESCRIPTION OF THE DRAWINGS

For a better understanding of the invention, reference is made to the following description of exemplary embodiments thereof, and to the accompanying drawings, wherein.

DETAILED DESCRIPTION OF PREFERRED EMBODIMENTS

Preferred embodiments of the present invention will be described below in more detail with reference to the accompanying drawings.

Figure 1:
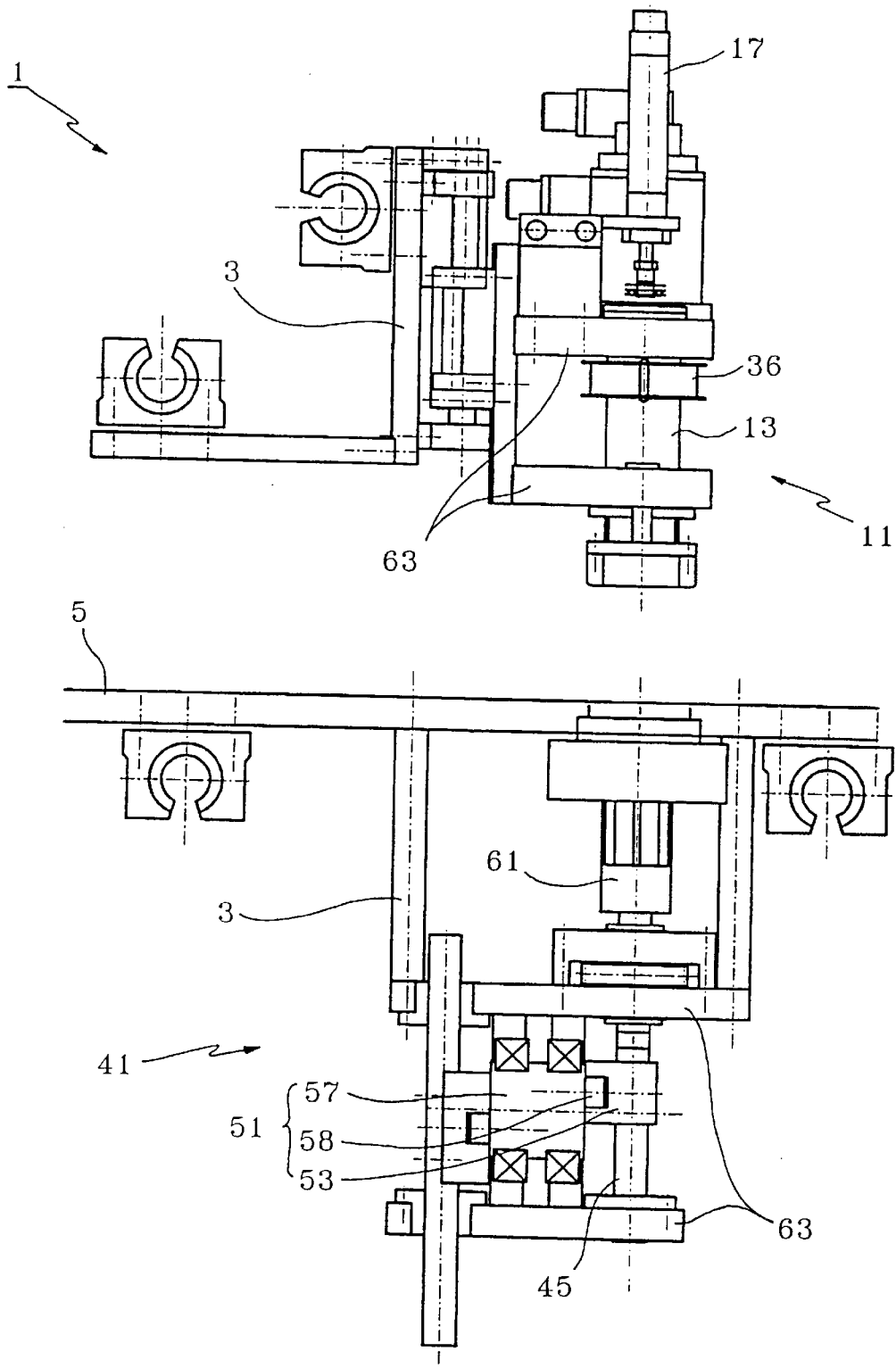
FIG. 1 is a side view illustrating an embodiment of a sawing machine in accordance with the present invention.
Figure 2:
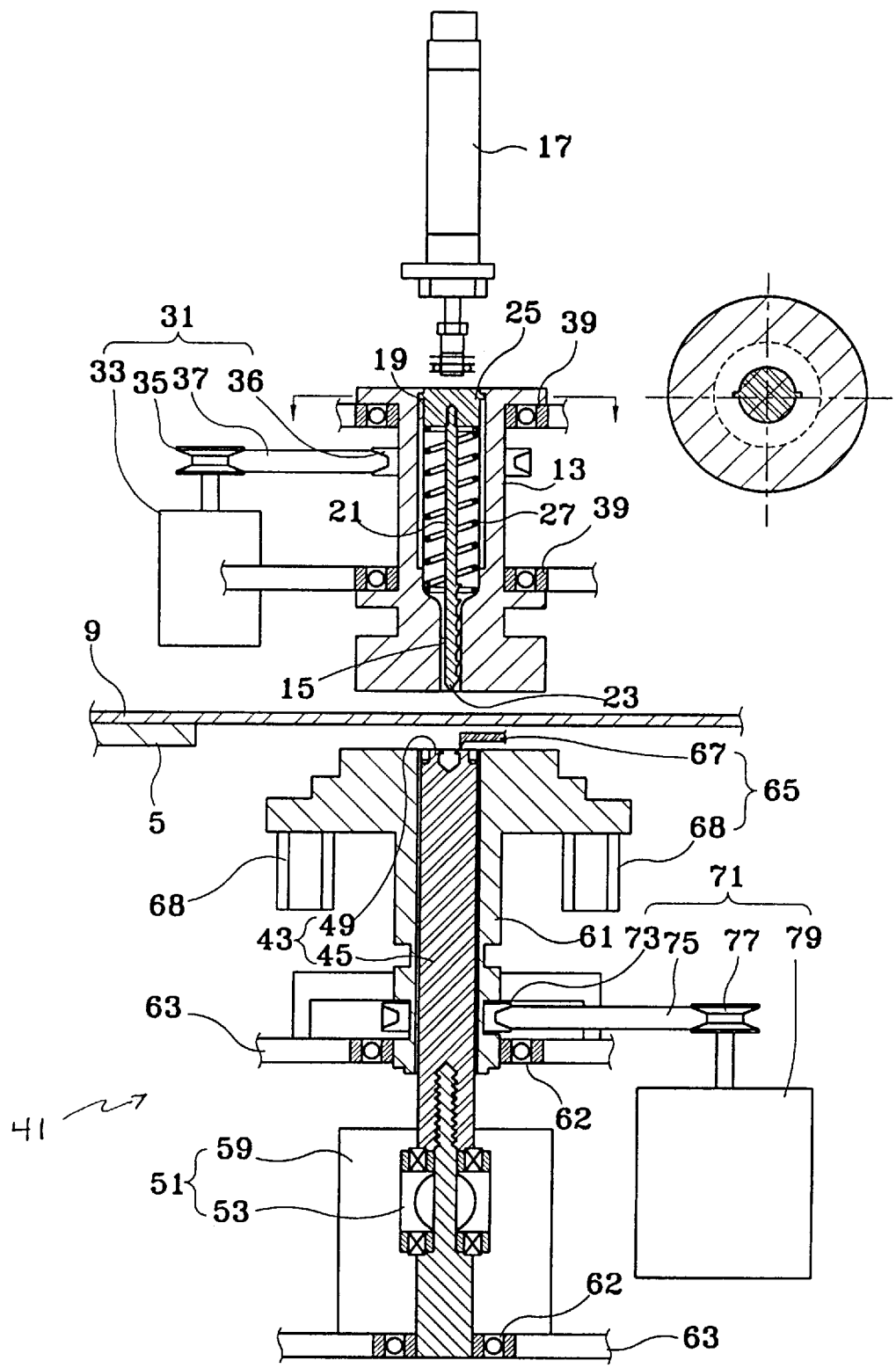
FIG. 2 is a front view in cross-section illustrating the sawing machine of FIG. 1.

FIG. 1 is a side view of a workpiece processing machine for sawing and drilling according to an embodiment of the present invention, and FIG. 2 is a front cross-sectional view illustrating the sawing machine shown in FIG. 1. As can be seen in the figures, a sawing machine 1 comprises a table 5 disposed in a horizontal direction at the central portion of a frame 3 forming the overall appearance thereof, and a drilling processing assembly 11 and a sawing processing assembly 41 are provided on opposing sides of and centered about table 5. The table 5 is movably positioned along a plate surface of the frame 3, and configured to support a predetermined plate member for processing.

The drilling processing assembly 11 comprises a cylindrical saw blade accommodating tube 13 which is disposed in a vertical direction. A bore 15 having a downwardly-formed opening is formed in tube 13. A saw blade 21 is positioned in the saw blade accommodating tube 13 and is configured to move upwards and downwards. A saw blade cylinder 17 for moving the saw blade 21 positioned in the saw blade accommodating tube 13 upwards and downwards is positioned adjacent an end of tube 13. A rotary driving assembly 31 is operatively connected to the saw blade accommodating tube 13 for rotating the saw blade accommodating tube 13. A drill bit 23 is formed at a lower portion of the saw blade 21, and a slider 25 slidably mounted within an inner wall of the saw blade accommodating tube 13 is connected to the upper portion of saw blade 21. A guiding rail grove 19 for guiding the slider 25 is formed along a longitudinal direction of an inner wall surface of the saw blade accommodating tube 13. When the saw blade 21 ascends or descends, the drill bit 23 can project and retract through the saw blade bore 15 of the saw blade accommodating tube 13. An elastic spring 27 for elastically urging the slider 25 upwards is positioned in the saw blade accommodating tube 13.

The rotary driving assembly 31 of the saw blade accommodating tube 13 comprises a drill motor 33 spaced apart with a predetermined interval at an outer side of the saw blade accommodating tube 13, a driving pulley 35 mounted on a driving shaft of the drill motor 33, a driven pulley 36 disposed about a circumferential surface of the saw blade accommodating tube 13, and a belt 37 operatively connecting the driving pulley 35 and the driven pulley 36 so as to transfer the driving force of the drill motor 33. A pair of bearings 39 are installed on the circumferential surface of the saw blade accommodating tube 13 along a longitudinal direction thereof. The bearings 39 minimize the friction and vibration associated with the high-speed rotation of the saw blade accommodating tube 13.

The sawing processing assembly 41 comprises a chucking part 43 for chucking the saw blade 21 which is passed through a plate member 9, an elevation driving part 51 for moving the chucking part 43 upwards and downwards, and a rotary driving part 71 for rotating the chucking part 43.

Figure 6:
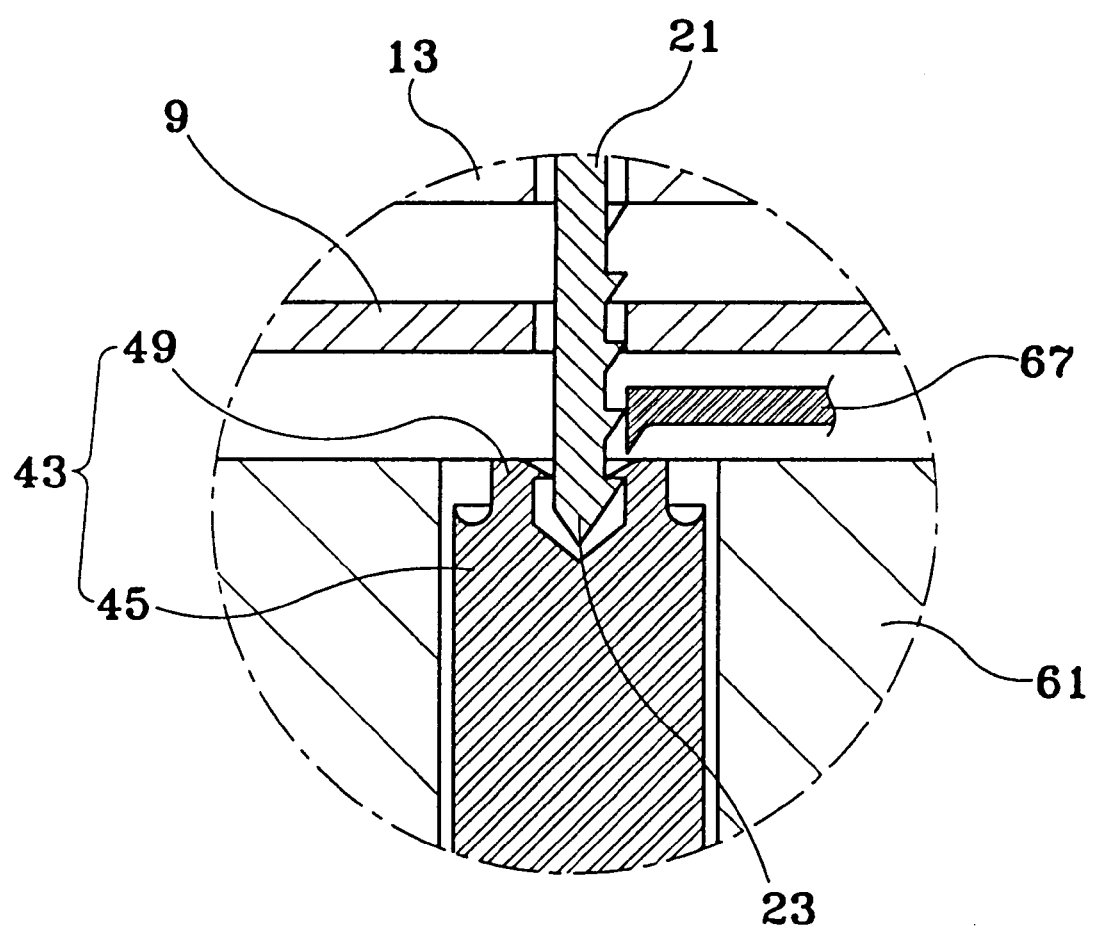
FIG. 6 is an exploded cross-sectional view of FIG. 5 showing a state that a saw blade is chucked.

The chucking part 43 comprises a round, bar shaped chucking member 45, which is disposed on a side of the longitudinal axis of plate member 9 which is opposite to the saw blade accommodating tube 13 and configured to be ascended and descended, and a hook 49 positioned at an upper end of the chucking member 45. Referring to FIG. 6. The hook 49 is biased such that it is capable of moving between an engagement position with the drill bit 23 of the saw blade 21 and a release position therefrom.

The elevation driving part 51 of the chucking part 43 comprises an elevation motor 59 spaced apart at a predetermined distance to one side of the chucking member 45, a driving bearing 57 connected to a driving shaft of the elevation motor 59, and a driven bearing 53 installed at a lower end portion of the chucking member 45. The driven bearing 53 is interposed between the chucking members 45 which are integrally movably connected up and down. The driving bearing 57 and the driven bearing 53 have an axis of rotation which is transverse with respect to the longitudinal axis of the chucking member 45. The driving bearing 57 includes an action bar 58 which is placed eccentrically at a predetermined distance from the rotating shaft and is protruded toward the driven bearing 53. The action bar 58 and the rotating shaft of the driven bearing 53 are engaged with each other. By such a configuration, a rotary driving force of the elevation motor 59 is transferred via the driving bearing 57 and the driven bearing 53 to cause the chucking member 45 to ascend and descend. At this time, the chucking member 45 is disposed in a vertical direction at the lower portion of the table 5, and positioned in a bushing 61 which is fixed by a supporting block 63 so that the chucking member 45 may be guided upwards and downwards.

The rotary driving part 71 comprises a rotary motor 79 disposed at one side of the bushing 61, a driving pulley 77 connected to the driving shaft of the rotary motor 79, a driven pulley 73 connected to a circumferential surface of the bushing 61, and a belt 75 operatively connecting the driving pulley 77 and the driven pulley 73 for transferring the driving force therebetween. When the bushing 61 is rotated by the rotary driving part 71, the chucking member 45 is also rotated. Bearings 62 are installed on the circumferential surface of the bushing 61 and the chucking member 45, respectively, to provide easier rotation. The rotary motor 79 is provided to synchronously rotate according to the rotation of the drill motor 33.

The sawing processing assembly 41 further comprises a chucking release part 65 arranged on an upper portion of the chucking part 43 and configured to release the saw blade 21 chucked to the chucking part 43. The chucking release part 65 includes a release pin 67 for pressing the hook 49 toward a release direction, and a release cylinder 68 for moving the release pin 67 forwards and backwards with respect to the hook 49. The release pin 67, installed in a manner to be movable up and down integrally with the bushing 61, and the release cylinder 68 move the bushing 61 upwards and downwards with respect to the chucking member 45. When the release pin 67 descends by the release cylinder 68, chucking between the saw blade 21 and the hook 49 is released.

Figure 3:
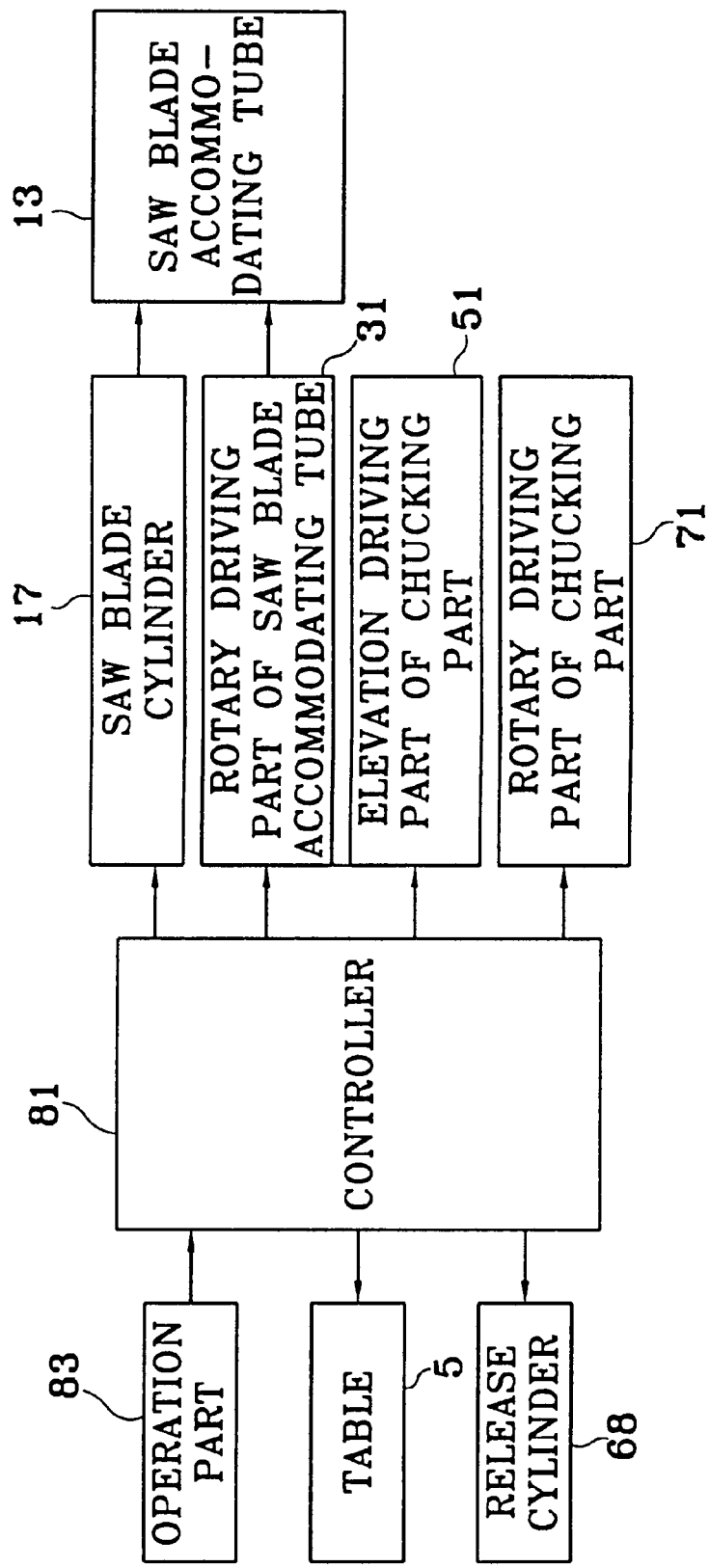
FIG. 3 is a block diagram of the sawing machine shown in FIG. 1.

The sawing machine 1 constructed as described above, as shown schematically in FIG. 3, comprises the table 5 for supporting a plate member, the saw blade cylinder 17 for moving the saw blade 21 up and down, the rotary driving part 31 of the saw blade accommodating part for integrally rotating the saw blade 21 and the saw blade accommodating tube 13 in which the saw blade 21 is accommodated, and the elevation driving part 51 of the chucking part for moving the chucking part 43 chucked to the saw blade 21 up and down.

The various parts and functions of the sawing machine are controlled by a controller 81. The controller 81 stores predetermined data relating to sawing processing, and performs drilling and sawing functions into the plate member 9 based on an external set of data which is input into the controller 81 via an operation part 83 and stored data. The controller 81 also controls the release cylinder 68 to release the saw blade 21 chucked to the chucking part 43.

Figure 7:
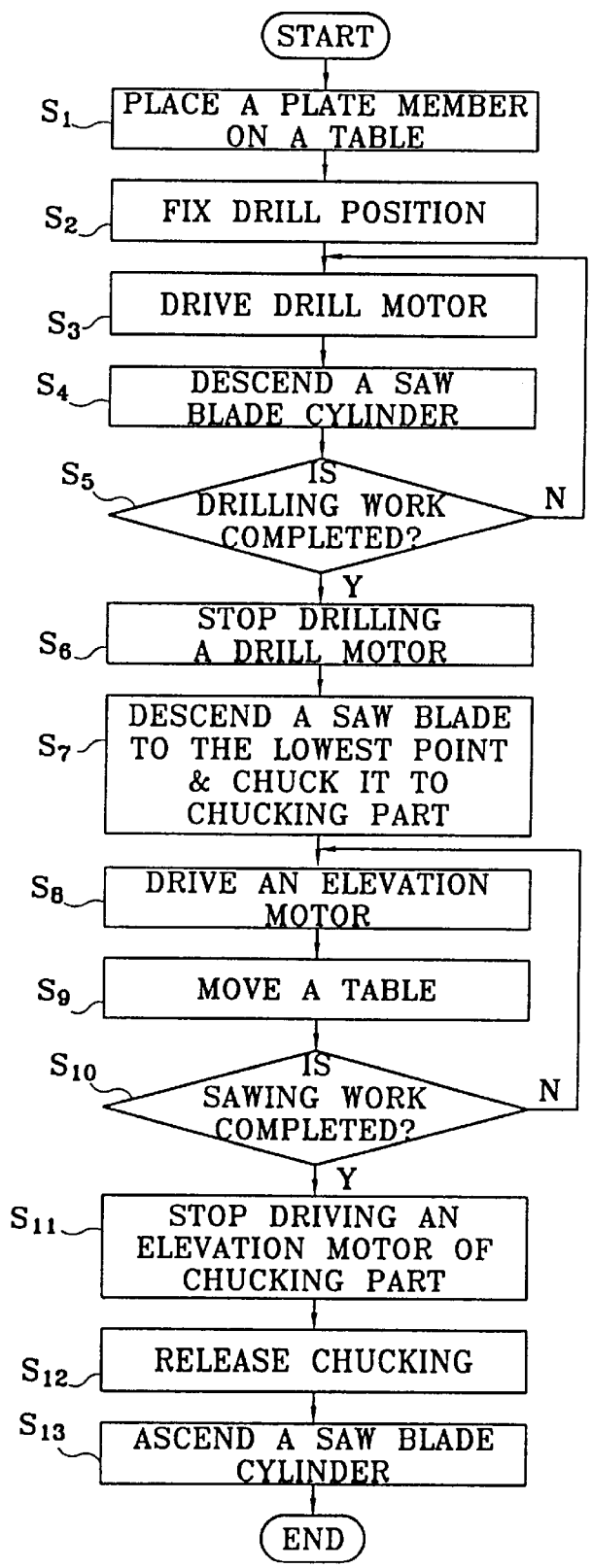
FIG. 7 is a flow chart illustrating a sawing process according to the present invention.
Figure 8:
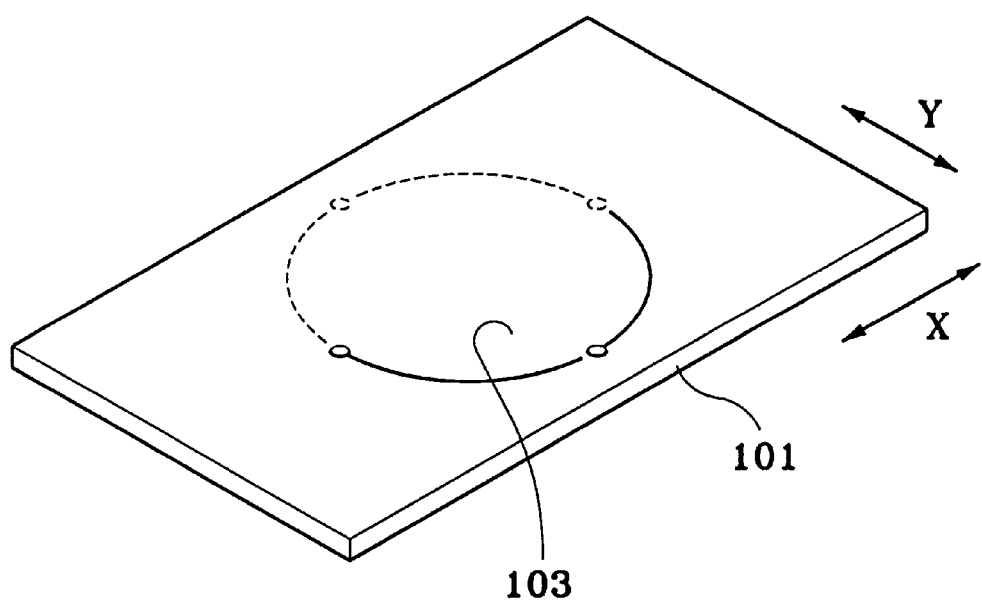
FIG. 8 is a perspective view illustrating a processed plate member.

A sawing processing method which utilizes an embodiment of the sawing machine according to the present invention will now be described in detail with reference to the flow chart of FIG. 7. To execute a sawing function, the plate member 9 is first placed on the table 5 (step S1). The controller 81 controls the table 5 according to the external input and stored data to position the plate member 9 being drilled perpendicularly under the saw blade 21 (step S2). When the plate member 9 is properly positioned, the drill motor 33 is driven to rotate the saw blade accommodating tube 13 (step S3), and at the same time the saw blade cylinder 17 is descended (step S4) to perform a drilling function on the plate surface of the plate member.

When the drilling work is completed (step S5), the controller sends a stop signal to the drill motor 33, causing reduction in the speed of the saw blade 21 to a gradual halt (step S6). At the same time the saw blade 21 is lowered by descending saw blade cylinder 17 until a notch adjacent to drill bit 23 engages with hook 49 (see FIG. 6) of chucking member 43, thereby chucking the drill bit end portion of saw blade 21 (step S7). In the chucked position, the saw blade 21 is engaged at both ends, to chucking member 43 at the drill bit end portion and engaged to the saw blade accommodating tube 13 at the other end, causing the rotational or reciprocal moving parts at opposite sides of the work piece to move synchronously or in locked step fashion. In such configuration, the saw blade 21 is provided with added strength and damage and breakage of the saw blade 21 are prevented.

Figure 4:
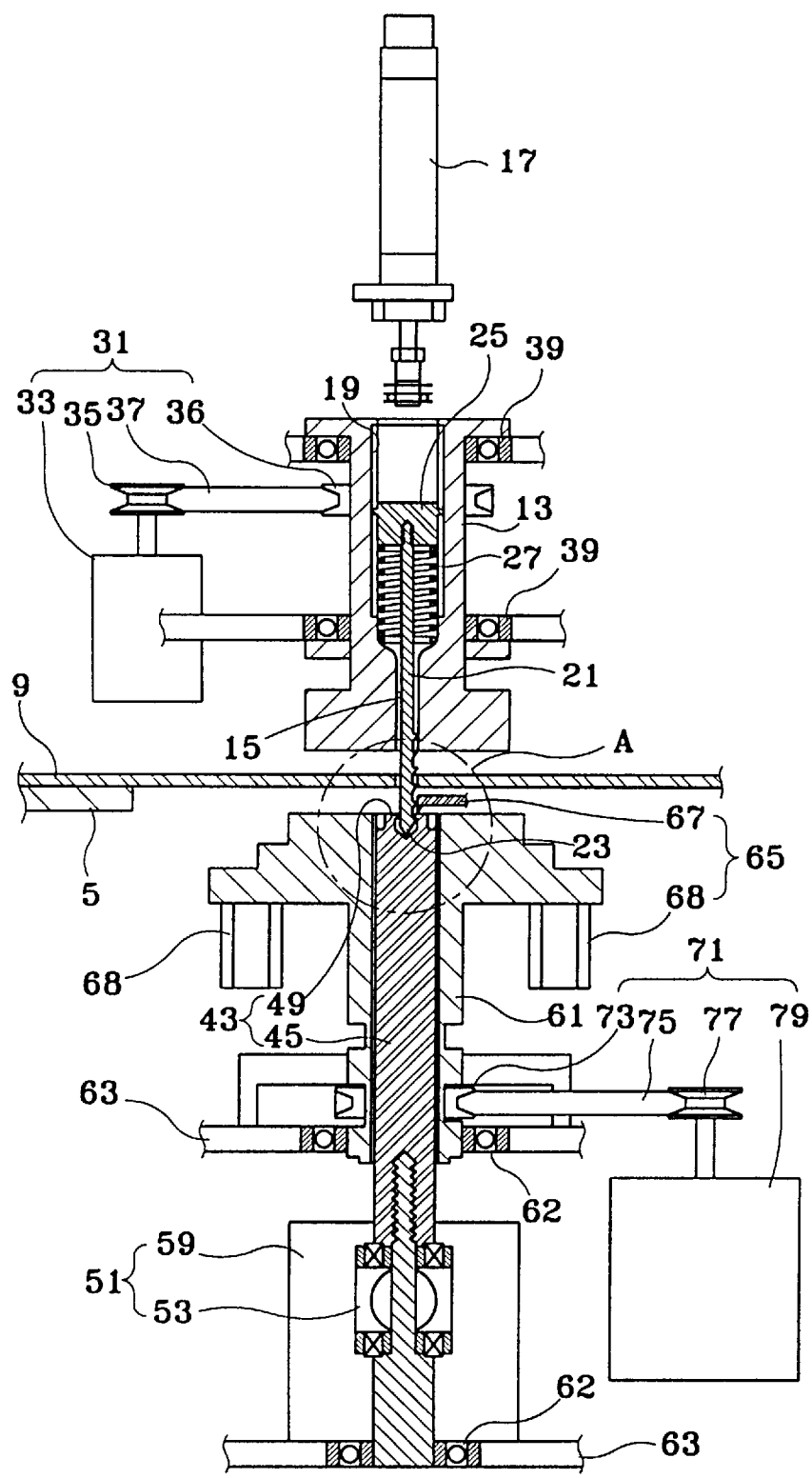
FIGS. 4 and 5 are cross-sectional views showing working states of the sawing machine of FIG. 2, in which a drilling function and a sawing function are performed in turn.
Figure 5:
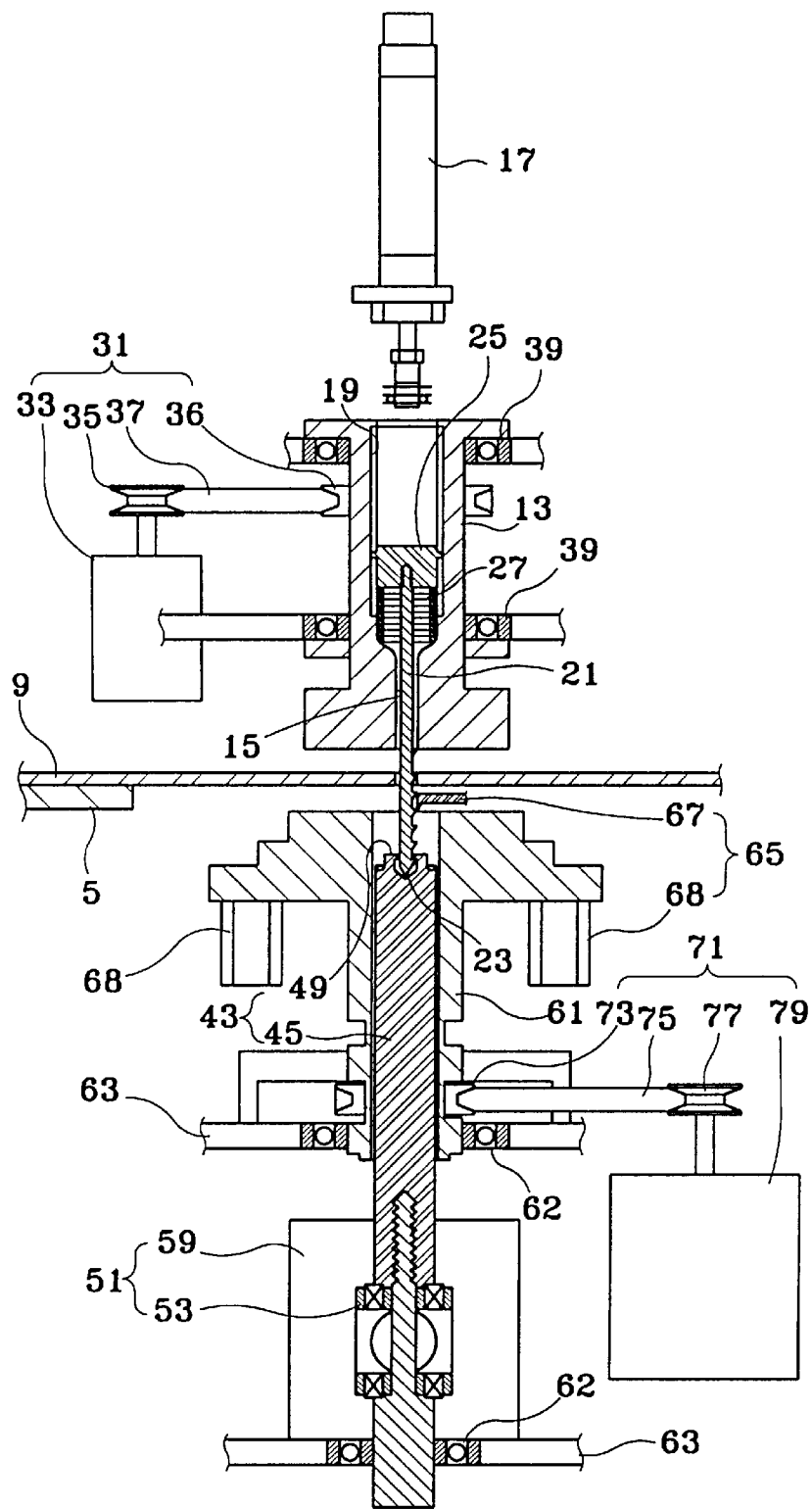

FIG. 6 shows an exploded view of the drill part 23 of the saw blade 21 chucked to the hook 49 of the chucking part 43. When the saw blade 21 is chucked to the chucking part 43, the controller 81 drives the elevation motor 59 of the chucking part to rotate the driving bearing 57 (step S8). At this time, the rotation of the action bar 58 of the driving bearing 57 which is placed eccentrically makes the driven bearing 53 move up and down, so that the chucking member 45 is moved upwards and downwards. Thus, as shown in FIGS. 4 and 5, the saw blade 21 is moved upwards and downwards. When the chucking part 43 starts to ascend and descend, the controller 81 simultaneously controls the movement of table 5 (step S9) to cause a desired sawing work to be performed on the plate member 9.

When the sawing work is completed (step S10), the controller 81 stops the elevation motor 59 (step S11), and releases the chucking of the saw blade 21 by descending the release pin 67 via the release cylinder 68 (step S12). Next, the saw blade 21 is moved to an initial position by moving the saw blade cylinder 17 upwards and downwards (step S13).

Figure 9:
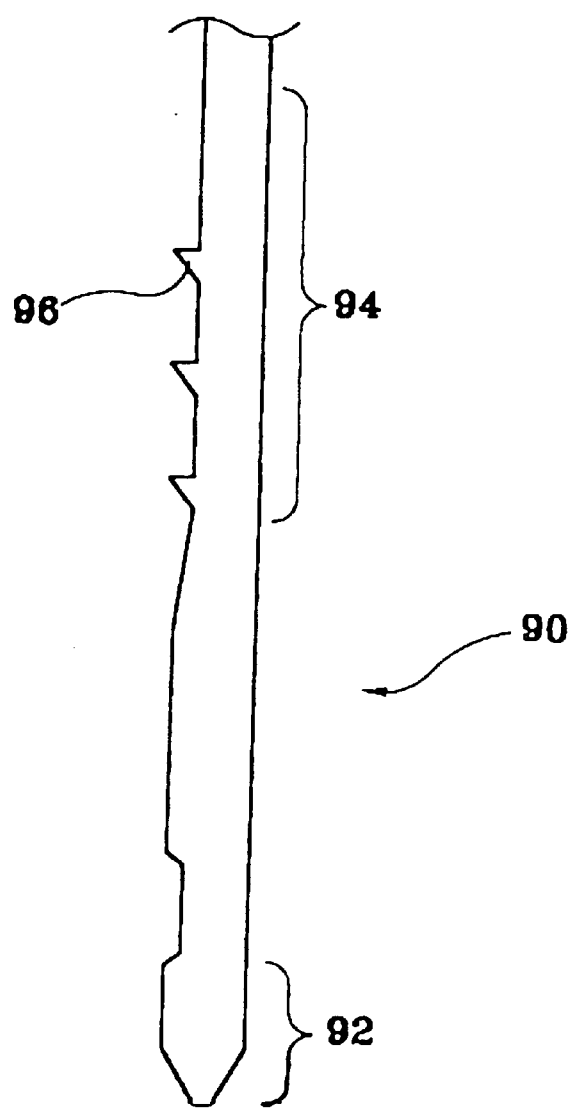
FIG. 9 is a perspective view illustrating a combination saw blade and drill bit for use with the sawing machine of the present invention.

Referring now to FIG. 9, a combination saw blade and drill bit member 90 for use with the sawing machine 1 of the present invention is illustrated. Combination member 90 includes a drill bit portion 92 and a saw blade portion 94. The drill bit portion 92 forms a tip on an end of combination assembly 90 which allows a user to drill a hole in an object, such as a plate material, to provide access within the object for the saw blade portion. Once the hole is formed in the object via the drill bit portion 92, the combination member 90 may be projected through the hole to facilitate cutting a desired shape in the object via the saw blade portion 94. A plurality of teeth 96 are formed on an edge of saw blade portion 94 to facilitate cutting of an object. It is contemplated that a straight cutting edge may be formed on the combination member 90 to replace the plurality of teeth 96. The combination assembly may be configured in any dimension necessary to suit the particular needs of the work to be performed. For example, the diameter of the drill bit portion 92 may be larger or smaller, or the number of teeth 96 on the saw blade portion 94 may vary. Also, the combination assembly 90 is preferably formed of a suitable material, such as hardened metal, which is typically used for cutting through wood, plastic, metal or another material.

As described above, the sawing machine and the sawing processing method according to the present invention can perform drilling and sawing works integrally on a predetermined plate member.

Although the illustrative embodiments of the present invention have been specifically described herein with reference to the accompanying drawings, it will be apparent that numerous changes and modifications may be made thereto by one having ordinary skill in the art without departing from the spirit and scope of the invention. All such changes and modifications are intended to be included within the scope of the invention as defined by the appended claims.

What is claimed is:

1. A workpiece processing apparatus comprising:
   a workpiece mounting assembly for receiving a workpiece;
   a tool assembly having a tool mounting element configured for rotational and reciprocal motion, the tool assembly positioned adjacent to the workpiece mounting assembly;
   said workpiece mounting assembly being movable relative to said tool assembly to position said tool mounting element adjacent the workpiece; and
   a tool positioned in said tool mounting element and defining a longitudinal axis, said tool having a drilling portion and a cutting portion.

2. The workpiece processing apparatus as recited in claim 1, wherein the tool assembly includes a drilling assembly and a sawing assembly.

3. The workpiece processing apparatus as recited in claim 1, further comprising:
   a controller for controlling the movement of the workpiece mounting assembly and the tool assembly.

4. The workpiece processing apparatus as recited in claim 3, wherein the controller controls movement of the workpiece mounting assembly and the tool assembly according to data which corresponds to a predetermined cut configuration.

5. The workpiece processing apparatus as recited in claim 2, wherein the sawing assembly further comprises a chucking member for chucking the tool.

6. The workpiece processing apparatus as recited in claim 5, wherein the chucking member is shaped in the form of a round bar and has a hook assembly on an upper end thereof, the hook assembly configured to move between an engagement position with an end of the tool after the end is passed through a hole formed in the workpiece, and a release position therefrom.

7. The workpiece processing apparatus according to claim 5, wherein the sawing assembly further comprises:

a bushing configured to at least partly house the chucking member, the bushing further configured to guide the chucking member during longitudinal motion;

a motor mounted adjacent to the chucking member;

a driving pulley mounted on a driving shaft connected to the motor;

a driven pulley mounted on a circumferential surface of the bushing; and a belt mounted around the driving pulley and the driven pulley to transfer a driving force of the motor from the driving pulley to the driven pulley to rotate the bushing.

8. The workpiece processing apparatus according to claim 5, wherein the sawing assembly further comprises:

an elevation motor assembly mounted adjacent to the chucking member for moving the chucking member in a longitudinal reciprocating motion.

9. The workpiece processing apparatus according to claim 5, wherein the sawing assembly further comprises:

a release mechanism for releasing the engagement of the tool.

10. The workpiece processing apparatus according to claim 2, wherein the drilling assembly further comprises:

an actuator for moving the tool in a longitudinal direction; and a rotary driving assembly for rotating the tool.

11. The workpiece processing apparatus according to claim 10, wherein the rotary driving assembly further comprises:

a motor mounted adjacent to the tool mounting element;

a driving pulley mounted on a driving shaft connected to the motor;

a driven pulley mounted on a circumferential surface of the tool mounting element; and a belt mounted around the driving pulley and the driven pulley to transfer a driving force of the motor from the driving pulley to the driven pulley.

12. A method for processing a workpiece comprising the steps of:

providing a workpiece processing apparatus having a tool capable of performing a drilling function and a sawing function;

placing a workpiece on a workpiece mounting assembly of the workpiece processing apparatus;

positioning the tool above a predetermined location on the workpiece;

rotating the tool to drill a hole through the workpiece;

chucking the tool after it passes through the hole drilled in the workpiece; and reciprocating the tool to cut a portion of the workpiece.

13. The method for processing a workpiece as recited in claim 12 further comprising the step of:

moving the workpiece mounting assembly to thereby move and cut the workpiece based on stored data.

14. The method for processing a workpiece as recited in claim 12 further comprising the step of:

moving the workpiece mounting assembly to thereby move and cut the workpiece based on programmable data.

15. A cutting and drilling tool comprising:

an elongate shaft wherein a first portion of the elongate shaft is formed in a shape of a drill bit for drilling a hole in a workpiece, a second portion of the elongate shaft has at least one cutting edge formed thereof for cutting the workpiece, and a third portion of the elongate shaft has a notch formed thereon for facilitating chucking of the tool, said notch is formed adjacent to the first portion.

16. The cutting and drilling tool as recited in claim 15, wherein the elongate shaft is formed of a hardened steel.

17. The cutting and drilling tool as recited in claim 15, further comprising a plurality of saw teeth formed on the second portion of the elongate shaft for cutting the workpiece.

* * * * *